United States Patent Office 3,455,935
Patented July 15, 1969

3,455,935
4-HYDROXY-4-PHENYLPIPERIDINES
Otis Earl Fancher and Shin Hayao, Elkhart, Ind., assignors to Miles Laboratories, Inc., Elkhart, Ind., a corporation of Indiana
No Drawing. Continuation of application Ser. No. 300,086, Aug. 5, 1963. This application June 12, 1967, Ser. No. 645,863
Int. Cl. C07d 29/20
U.S. Cl. 260—294                              2 Claims

ABSTRACT OF THE DISCLOSURE

Compounds of the formula:

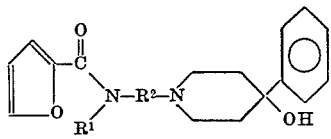

where $R^1$ is phenyl or phenylalkyl and where $R^2$ is either

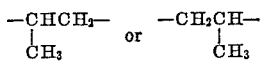

and pharmaceutically acceptable addition salts thereof are described. The compounds have utility as analgetic agents.

---

This invention relates to derivatives of 4-hydroxy-4-phenylpiperidine. In one of its more particular aspects, this invention relates to compounds containing the 4-hydroxy-4-phenylpiperidyl moiety which also contain amide urethane groups.

The compounds of this invention correspond to the structural formula

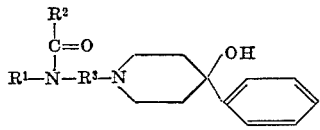

wherein $R^1$ may be aryl or aralkyl; $R^2$ may be lower alkyl, lower alkoxy, cycloalkyl or heterocyclic and $R^3$ is an alkylene radical.

In a preferred subgroup of compounds, $R^1$ is phenyl or phenalkyl; $R^2$ is lower alkyl, lower alkoxy, cyclohexyl or furyl and $R^3$ is a lower alkylene radical.

Of particular interest are those compounds in which $R^3$ is a branched chain propylene radical, that is,

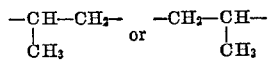

The latter compounds form an especially preferred subgroup of the compounds of this invention.

These compounds are generally furnished in the form of their water-soluble salts such as their hydrochlorides, oxalates, maleates, cyclohexylsulfamates or the like. They may also be provided as quaternary salts such as the methiodide if desired.

The compounds of this invention may be readily prepared by alkylation of 4-hydroxy-4-phenylpiperidine with the appropriately substituted alkyl halide. Generally, their preparation involves a series of steps including alkylation, reduction and subsequent acylation, as shown in the following reaction sequence:

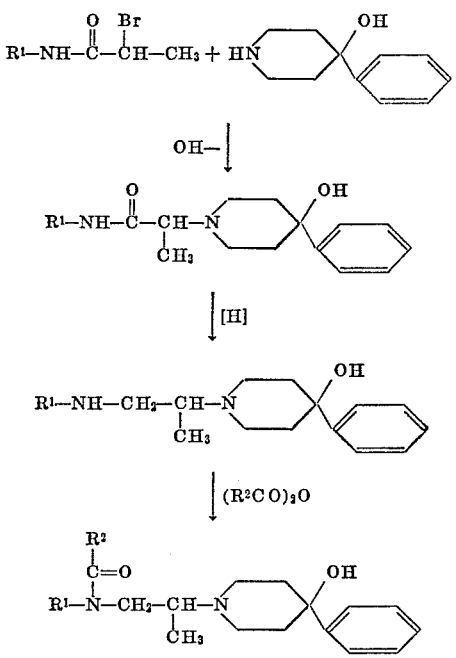

An alternative procedure where the isomeric propylene moiety is desired involves the following reaction scheme:

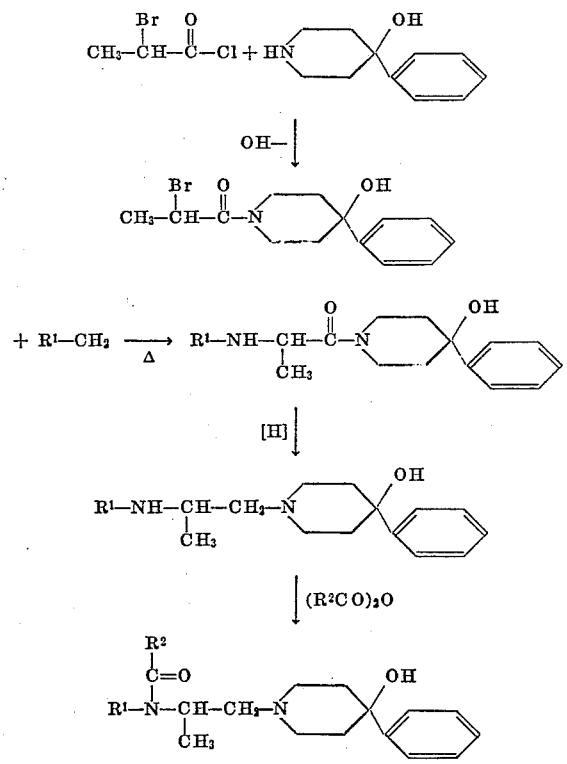

The compounds of this invention are useful as analgetic agents.

This invention will be better understood by reference to the following examples which, however, are included merely for purposes of illustration.

EXAMPLE 1

α-(4-hydroxy-4-phenyl-1-piperidyl)propionanilide

A. A solution of 4-hydroxy-4-phenylpiperidine (21.6 g., 0.122 mole and α-bromopropionanilide (27.9 g., 0.122 mole) in 250 ml. of 2-propanol in presence of 14.4 g. (0.124 mole of anhydrous sodium carbonate was refluxed for 16 hours with vigorous stirring. It was filtered while hot and the filtrate was concentrated in vacuo to give a solid mass which was once recrystallized from aqueous methanol to give a colorless solid of M.P. 133–134°, yield 34.3 g. The filtrate was diluted with water to give a pale yellow solid of M.P. 133–134°, yield 2.6 g. The total yield was 36.9 g. (93.2%), $\lambda_{max}^{CHCl_3}$: 2.78 (O—H), 2.90 (O—H), 3.02 (N—H), 5.94 (amide C=O), 6.56μ (amide II)

*Analysis.*—Calcd. for $C_{20}H_{29}N_2O_2$: N, 8.64. Found: N, 8.68.

1-anilino-2-(4-hydroxy-4-phenyl-1-piperidyl)propane

B. α-(4 - hydroxy-4-phenyl-1-piperidyl)propionanilide (45.0 g., 0.139 mole) in 150 ml. of T.H.F. was added dropwise to a slurry of lithium aluminum hydride (8.0 g., 0.21 mole) in 250 ml. of T.H.F. during 30 minutes to give a gray mixture which was refluxed for 8 hours and set aside overnight. The excess hydride was decomposed and the solution was concentrated in vacuo to leave an amber syrup which was distilled to give a pale yellow viscous liquid of B.P. 202–215° (0.25 mm.), yield 30.3 g.

$\lambda_{max}^{CHCl_3}$: 1.47 (O—H), 1.56 (N—H), 2.79 (O—H), 2.99 (N—H), 8.59μ (C—O stretch. test. alcohol)

*Analysis.*—Calcd. for $C_{20}H_{26}N_2O$: N (basic), 4.52. Found: N (basic), 4.51 (titration)

N-[2-methyl-2-(4-hydroxy-4-phenyl-1-piperidyl)ethyl] propionanilide

C. The above amine (30.0 g.) was dissolved in 50 ml. of benzene and propionic anhydride (25 ml.) was added. The solution was refluxed for an hour and the solvent was removed in vacuo. The residue was dissolved in ether, washed with sodium hydroxide solution and dried over anhydrous magnesium sulfate. The solution was treated with 8.7 g. (0.097 mole) of anhydrous oxalic acid to give a light tan sticky gum which gradually solidified on scratching. The solid was collected on a filter, washed with ether and dried in air, yield 43.9 g. It was once recrystallized from methanol ether to give a solvated solid which was collected and dried in vacuo, yield 31.7 g., M.P. 103–105° (dec.). The free base:

$\lambda_{max}^{CHCl_3}$: 1.47μ, (O—H), no N—H at 1.56μ

*Analysis.* Calcd. for $C_{23}H_{30}N_2O_2 \cdot C_2H_2O_4$: N, 6.14. Found: N, 6.07.

EXAMPLE 2

4-hydroxy-4-phenyl-1-(α-anilinopropionyl)piperidine

A. A toluene solution of α-bromopropionyl chloride (68.6 g., 0.4 mole) was added slowly to an ice cold, stirred suspension of 4-hydroxy-4-phenylpiperidine (70.8 g., 0.4 mole) in 750 ml. of toluene and 130 ml. of 20% sodium hydroxide and the stirring was continued overnight. The layers were separated and the dried toluene layer was concentrated in vacuo to half its volume. This concentrate and aniline (74.4 g., 0.8 mole) were heated under reflux with stirring for 16 hours. The solvent was removed in vacuo to leave a solid mixture of amide and aniline hydrobromide. This solid was suspended in water and let stand overnight. The solid amide was then collected washed with water and dried. The solid was triturated in ether and again collected and dried, yield 112.9 g. (87%), M.P. 147.5–148.5°.

*Analysis.*—Calcd. for $C_{20}H_{24}N_2O_2$: N, 8.64. Found: N, 8.65.

2-anilino-1-(4-hydroxy-4-phenyl-1-piperidyl) propane

B. A tetrahydrofuran solution of the above amide (112.9 g., 0.348 mole) was added slowly to a stirred suspension of lithium aluminum hydride (19.8 g., 0.522 mole) in 400 ml. of tetrahydrofuran and the mixture was heated under reflux for 8 hours. The excess lithium aluminum hydride was decomposed by slowly adding a solution of 20 ml. of water in 100 ml. of tetrahydrofuran, followed by 20 ml. of 20% sodium hydroxide and 60 ml. of water. The mixture was filtered and the filtrate was concentrated in vacuo to a viscous liquid. An I.R. gave an amide carbonyl band at 6.10μ to indicate incomplete reduction. The reduction was repeated and the excess lithium aluminum hydride was decomposed in the same manner. The mixture was filtered and the filtrate was concentrated in vacuo and distilled, using a short path column, B.P. 195–210° (0.20–0.30 mm.), yield 39.5 g. (36.6%).

*Analysis.*—Calcd. for $C_{20}H_{26}N_2O$: N, 9.03. Found: N, 9.04.

N-[1-methyl-2-(4-hydroxy-4-phenyl-1-piperidyl)ethyl] propionanilide oxalate

C. A solution of N-[1-methyl-2-(4-hydroxy-4-phenyl-1-piperidyl)ethyl]aniline (39 g., 0.125 mole), propionic anhydride (39 g., 0.3 mole) and 250 ml. of benzene was heated under reflux for 3 hours. The solvent was removed in vacuo and the dark oil was dissolved in chloroform and washed with dilute sodium hydroxide solution. The chloroform layer was dried over anhydrous magnesium sulfate, filtered and the filtrate was concentrated in vacuo. The concentrate of free base was dissolved in ether and an ether solution of oxalic acid (18 g., 0.2 mole) was added with cooling to form a sticky solid. The solvent was decanted and fresh ether was added. On cooling, the salt slowly solidified. The solid was collected and twice recrystallized from a methanol-ether solution, yield 41 g. (72%), M.P. 165.5–167.0° (dec.).

*Analysis.*—Calcd. for $C_{23}H_{30}N_2O_2 \cdot C_2H_2O_4$: N, 6.14; N (basic), 3.07. Found: N, 6.19; N (basic), 3.10.

EXAMPLE 3

1-(2-propionanilido propyl)-1-methyl-4-hydroxy-4-phenylpiperidinium iodide

A solution of N-[1-methyl-2-(4-hydroxy-4-phenyl-1-piperidyl)ethyl] aniline (18.2 g., 0.06 mole), propionic anhydride (13 g., 0.1 mole) and 200 ml. of benzene was heated under reflux for 3 hours. The solvent was removed in vacuo and the concentrate was dissolved in chloroform, washed with ammonium hydroxide and the solvent was again removed in vacuo. The concentrate was dissolved in acetone and 15 g. (0.105 mole) of iodomethane was added. The solution was heated on the steam bath for 15 minutes. The solvent was removed in vacuo and the oil failed to crystallize from several solvent combinations. The solvent was removed in vacuo and ether was added with cooling to slowly solidify the salt. The salt was collected and again triturated in ether. The solid was collected and dried in vacuo over refluxing acetone. The salt softened and decomposed over a range of 72–84°, yield 13.0 g. (42.7%).

*Analysis.*—Calcd. for $C_{24}H_{33}IN_2O_2$: C, 56.7; H, 6.50; N, 5.51. Found: C, 56.3; H, 6.64; N, 5.54.

EXAMPLE 4

N[2-(4-hydroxy-4-phenyl-1-piperidyl)propyl] benzylamine

A. A mixture of N-benzyl-α-bromopropionamide (48.4 g., 0.2 mole), 4-hydroxy-4-phenylpiperidine (35.4 g., 0.2 mole), sodium carbonate (23.4 g., 0.22 mole) and 400 ml. of 2-propanol was heated under reflux with stirring for 18 hours. The mixture was cooled, filtered and the filtrate was concentrated in vacuo to a viscous amide.

The reduction was accomplished by adding a THF solution of the amide dropwise to a stirred suspension of LiAlH$_4$ (11.4 g., 0.3 mole) in 250 ml. of THF and heated the mixture under reflux for 8 hours. The excess LiAlH$_4$ was decomposed in the usual way. The mixture was filtered and the filtrate was concentrated in vacuo and distilled, B.P. 195–205° (0.075 mm.), yield 20 g. (31%).

Analysis.—Calcd. for C$_{21}$H$_{28}$N$_2$O: N (basic), 8.65. Found: N (basic), 8.03.

N-benzyl-N-[2-(4-hydroxy-4-phenyl-1-piperidyl) propyl]propionamide oxalate

B. A mixture of N-[2-(4-hydroxy-4-phenyl-1-piperidyl)propyl]benzylamine (20 g., 0.062 mole) propionic anhydride (26 g., 0.2 mole) and 250 ml. of dry benzene was heated under reflux for 2 hours. The solvent was removed in vacuo and the cooled residue was made basic with dilute sodium hydroxide solution and extracted with ether. The extracts were dried (MgSO$_4$) and concentrated in vacuo. A crystalline free base could not be prepared.

An ether solution of oxalic acid (12 g., 0.13 mole) was added to an ether solution of the free base. The solvent was decanted from the sticky salt that formed and fresh ether was added to form a solid after standing for several days. The solid was recrystallized from a 2-propanol-ether solution, yield 7.9 g. (24.5%), M.P. 142–144° (dec.).

Analysis.—Calcd. for C$_{24}$H$_{32}$N$_2$O$_2$·C$_2$H$_2$O$_4$: N, 5.96. Found: N, 6.07.

EXAMPLE 5

N-carbethoxy-N-[1-methyl-2-(4-hydroxy-4-phenyl-1-piperidyl)ethyl]aniline sulfamate A chloroform solution of ethyl chloroformate (8.8 g., 0.08 mole) was added dropwise to a solution of N-[1-methyl - 2 - (4 - hydroxy - 4 - phenyl - 1 - piperidyl)-ethyl]aniline (25 g., 0.08 mole) in 200 ml. of chloroform and the solution was stirred overnight. The solution, containing a small amount of solid was made basic with ammonium hydroxide and the chloroform layer was separated and concentrated in vacuo to an oil. This free base was dissolved in hot methanol and an aqueous methanol suspension of sulfamic acid (7.8 g., 0.08 mole) was added and the solution that formed on additional heating was filtered and diluted with ether to form a solid. The solid was collected and recrystallized from a methanol-ether solution, M.P. 185–185.5° (dec.), yield 11.3 g. (29.3%).

Analysis.—Calcd. for C$_{23}$H$_{30}$N$_2$O$_3$·NH$_2$SO$_3$H: N, 8.76; N (basic), 2.92. Found: N, 8.65; N (basic), 2.99.

EXAMPLE 6

N-[1-methyl-2-(4-hydroxy-4-phenyl-1-piperidyl) ethyl]-β-phenethyl-amine

A. A benzene solution of α-bromopropionyl chloride (60 g., 0.34 mole) was added slowly to an ice-cold, stirred solution of 4-hydroxy-4-phenylpiperidine (62 g., 0.35 mole) in 300 ml. of benzene and 110 ml. of 20% NaOH and the mixture was stirred in the cold for an additional hour. The benzene layer was collected and concentrated to half its volume. This solution, β-phenethylamine (85 g., 0.7 mole) and 250 ml. of toluene were heated under reflux with stirring for 18 hours. The mixture was filtered and the filtrate was concentrated in vacuo to an oil. This oil in 250 ml. of THF was slowly added to a stirred suspension of LiAlH$_4$ (20 g., 0.512 mole) in 250 ml. of THF and the mixture was heated under reflux for 20 hours. The excess LiAlH$_4$ was decomposed by slowly adding a solution of 20 ml. of water and 80 ml. of THF, followed by 20 ml. of 20% sodium hydroxide solution and 60 ml. of water. The mixture was filtered and the filtrate was concentrated in vacuo to a solid. This solid was recrystallized from a DMF-methanol-water solution. M.P. 120.5–121.5°, yield 75.4 g. (64%).

Analysis.—Calcd. for C$_{22}$H$_{30}$N$_{20}$: N (basic), 8.28. Found: N (basic), 8.33.

N-β-phenethyl-N-[1-methyl-2-(4-hydroxy-4-phenyl-1-piperidyl)ethyl]propionamide hydrochloride B. A mixture of N-[1-methyl-2-(4-hydroxy-4-phenyl-1-piperidyl)ethyl]-β-phenethylamine (25 g., 0.074 mole), propionic anhydride (26 g., 0.2 mole) and 200 ml. of benzene was heated under reflux for 3 hours. The solvent was removed in vacuo and concentrate was dissolved in chloroform, made basic with ammonium hydroxide and the chloroform layer was collected and concentrated in vacuo. This concentrate was dissolved in methanol and 25 ml. of 2-propanol, saturated with dry HCl, was added. This solution was filtered and the filtrate was diluted with ether to form a white solid. The solid was collected, washed with ether and dried. M.P. 189–191° (dec.), yield 16.8 g. (52.8%).

Analysis.—Calcd. for C$_{25}$H$_{34}$N$_2$O$_2$·HCl: N, 6.50; N (basic), 3.25. Found: N, 6.62; N (basic), 3.31.

EXAMPLE 7

N-2-furoyl-N-[1-methyl-2-(4-hydroxy-4-phenyl-1-piperidyl)ethyl]aniline hydrochloride A chloroform solution of 2-furoylchloride (10.5 g., 0.0806 mole) was added dropwise to a solution of N-[1-methyl - 2 - (4 - hydroxy - 4 - phenyl - 1 - piperidyl)ethyl] aniline (25 g., 0.0806 mole) in 200 ml. of chloroform and the mixture was stirred for an additional hour. Only a small amount of solid was formed, so the solution was made basic with ammonium hydroxide and the chloroform layer was concentrated in vacuo to an oil. The free base was dissolved in ethanol and a 2-propanol solution, containing 8 g. of dry HCl, was added and the solution was diluted with ether and cooled. This solid was collected by filtration and was the dihydrochloride of the starting material. A crystalline solid separated in the filtrate. It was collected and dried, M.P. 200–202° (dec.), yield 4 g.

Analysis.—Calcd. for C$_{25}$H$_{28}$N$_2$O$_3$·HCl: N, 6.36; N (basic), 3.18. Found: N, 6.28; N (basic), 3.12.

EXAMPLE 8

N-[1-methyl-2-(4-hydroxy-4-phenyl-1-piperidyl)ethyl]-cyclohexanecarboxanilide

A chloroform solution of cyclohexanecarbonyl chloride (12 g., 0.08 mole) was slowly added to a stirred solution of N-[1-methyl-2-(4-hydroxy-4-phenyl-1-piperidyl]aniline (18.6 g., 0.06 mole) in 150 ml. of chloroform and the solution was heated under reflux for 2 hours. The solvent was removed in vacuo and the concentrate was dissolved in a methanol-ether solution and an ether solution of oxalic acid (9 g., 0.1 mole) was added. The salt oiled out, but slowly solidified on cooling. The solid was recrystallized once from an ethanol-ether solution and once from ethanol, yield 4.2 g. (13.7%), M.P. 165.5–167.0° (dec.).

Analysis.—Calcd. for C$_{27}$H$_{36}$N$_2$O$_2$·C$_2$H$_2$O$_4$: N, 5.49; N (basic), 2.75. Found: N, 5.41, N (basic), 2.63.

In summary, this invention provides a series of novel therapeutic compounds of the 4-hydroxy-4-phenyl piperidine series which have the above described formula. These compounds are potent narcotic-like analgetic agents.

What is claimed is:
1. A compound selected from the group consisting of compounds of the formula

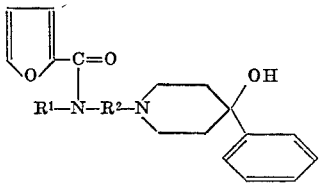

in which R¹ is a member selected from the group consisting of phenyl and phenylalkyl, R² is a member selected from the group consisting of

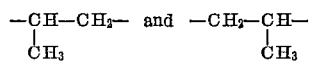

and therapeutically acceptable salts thereof.

2. A compound of claim 1 which is N-2-furoyl-N-[1-methyl-2-(4-hydroxy-4-phenyl-1-piperidyl)ethyl]aniline.

References Cited
UNITED STATES PATENTS

| | | | |
|---|---|---|---|
| 2,960,507 | 11/1960 | Stern and Watt | 260—294.7 |
| 2,973,363 | 2/1961 | Janssen | 260—293.4 |
| 3,290,317 | 12/1966 | Carabateas | 260—293.4 |

HENRY R. JILES, Primary Examiner

G. THOMAS TODOL, Assistant Examiner

U.S. Cl. X.R.

260—294.7, 999

PO-1050
(5/69)

UNITED STATES PATENT OFFICE
CERTIFICATE OF CORRECTION

Patent No. 3,455,935          Dated July 15, 1969

Inventor(s) Otis Earl Fancher and Shin Hayao

It is certified that error appears in the above-identified patent and that said Letters Patent are hereby corrected as shown below:

Column 2, Lines 45-50,      The formula "$R^1-CH_2$" should read --$R^1-NH_2$--.

Column 6, Line 49      Insert immediately following "piperidyl" --) ethyl--.

SIGNED AND
SEALED

DEC 2 - 1969

(SEAL)
Attest:

Edward M. Fletcher, Jr.
Attesting Officer

WILLIAM E. SCHUYLER, J..
Commissioner of Patents